(12) United States Patent
Wilmot

(10) Patent No.: US 8,590,603 B2
(45) Date of Patent: Nov. 26, 2013

(54) HEAT EXCHANGER INSULATION GAP

(75) Inventor: George E. Wilmot, East Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1022 days.

(21) Appl. No.: 12/633,204

(22) Filed: Dec. 8, 2009

(65) Prior Publication Data

US 2011/0132584 A1  Jun. 9, 2011

(51) Int. Cl.
*F28F 13/00* (2006.01)
*F28F 13/06* (2006.01)

(52) U.S. Cl.
USPC .............................. 165/135; 165/136; 165/108

(58) Field of Classification Search
USPC ................... 165/135–136, 165, 143–144, 108
See application file for complete search history.

(56) References Cited

U.S. PATENT DOCUMENTS

| | | | |
|---|---|---|---|
| 1,947,109 A * | 2/1934 | Potter | 165/83 |
| 2,828,947 A * | 4/1958 | Hedbom | 165/166 |
| 4,281,510 A | 8/1981 | Borjesgard et al. | |
| 4,579,163 A * | 4/1986 | Maendel | 165/54 |
| 4,739,823 A | 4/1988 | Howard | |
| 4,829,275 A | 5/1989 | Croy | |
| 4,862,952 A | 9/1989 | Tarasewich et al. | |
| 5,551,245 A | 9/1996 | Calton et al. | |
| 6,520,252 B1 | 2/2003 | Bizzarro | |
| 6,612,114 B1 | 9/2003 | Klingels | |
| 6,942,183 B2 | 9/2005 | Zywiak | |
| 7,353,864 B2 | 4/2008 | Zaffetti et al. | |
| 8,079,407 B2 * | 12/2011 | Fellague et al. | 165/140 |
| 2008/0308264 A1 * | 12/2008 | Antonijevic | 165/165 |

FOREIGN PATENT DOCUMENTS

| | | | |
|---|---|---|---|
| DE | 19729239 A1 * | 1/1999 | |
| JP | 2004125352 A * | 4/2004 | |

* cited by examiner

*Primary Examiner* — Tho V Duong
(74) *Attorney, Agent, or Firm* — Carlson, Gaskey & Olds PC

(57) ABSTRACT

An aircraft heat exchanger that exchanges heat between fluid, like air, to be warmed and a medium, like a liquid, to be cooled has a first path that encounters the fluid to be warmed and carries the medium at a first temperature. A second path carries the medium at a second temperature adjacent to the first path. An insulation gap is disposed between the first path and the second path so that heat exchange between the first and second path is minimized.

3 Claims, 2 Drawing Sheets

HEAT EXCHANGER INSULATION GAP

BACKGROUND

Plate fin heat exchangers generally consist of a core formed of a plurality of stacked layers. Each layer has a plurality of continuously corrugated or finned elements that are arranged to form a plurality of channels. The channels in one layer may lie in transverse or parallel relation to the channels formed in adjacent layers. A parting sheet separates the adjacent layers. Fluids having differing amounts of heat energy flow through the channels of adjacent layers so that heat energy may be transferred from fluid to fluid.

Environmental control systems ("ECS") that utilize air cycle machines are well known. ECS systems generally control the temperature and humidity of air within an enclosed environment, such as an aircraft cabin, and usually include a compressor for pressurizing air input thereto, and a turbine for expanding and cooling the air. Some turbines are capable of delivering air at temperatures as low as 100° F. below zero.

At such cold temperatures moisture within the air may be precipitated out in the form of snow or ice. The ice and snow may clog and shut down any downstream components such as heat exchangers. If a heat exchanger becomes clogged, heat transfer among the fluids flowing therethrough may be severely reduced. The air from the turbine may not warm to usable levels for cabins and the fluid that warms the air from the ECS may not be cooled enough for effective downstream use.

SUMMARY

According to a non-limiting embodiment, an aircraft heat exchanger that exchanges heat between fluid, like air, to be warmed and a medium, like a liquid, to be cooled has a first path that encounters the fluid to be warmed and carries the medium at a first temperature. A second path carries the medium a second temperature adjacent to the first path. An insulation gap is disposed between the first path and the second path so that heat exchange between the first and second path is minimized.

According to a further non-limiting embodiment, a method for cooling a medium and warming a fluid in a heat exchanger is proposed. The method includes providing a first path for carrying the medium at a first temperature and encountering the fluid to be warmed, providing a second path for carrying the medium adjacent to the first path at second temperature, and providing an insulation gap between the first path and the second path such that heat exchange between the first and second path is minimized.

According to a still further non-limiting embodiment, a heat exchanger that exchanges heat between fluid, like air, to be warmed and a medium, like a liquid, to be cooled has a first path carrying the medium at a first temperature and encounters the fluid to be warmed. A second path carries the medium adjacent to the first path but the medium in the second path has a second temperature. An insulation gap is disposed between the first path and the second path so that heat exchange between the first and second path is minimized and so that a probability of freezing on the first path of the fluid is minimized.

DETAILED DESCRIPTION

Figure 1:
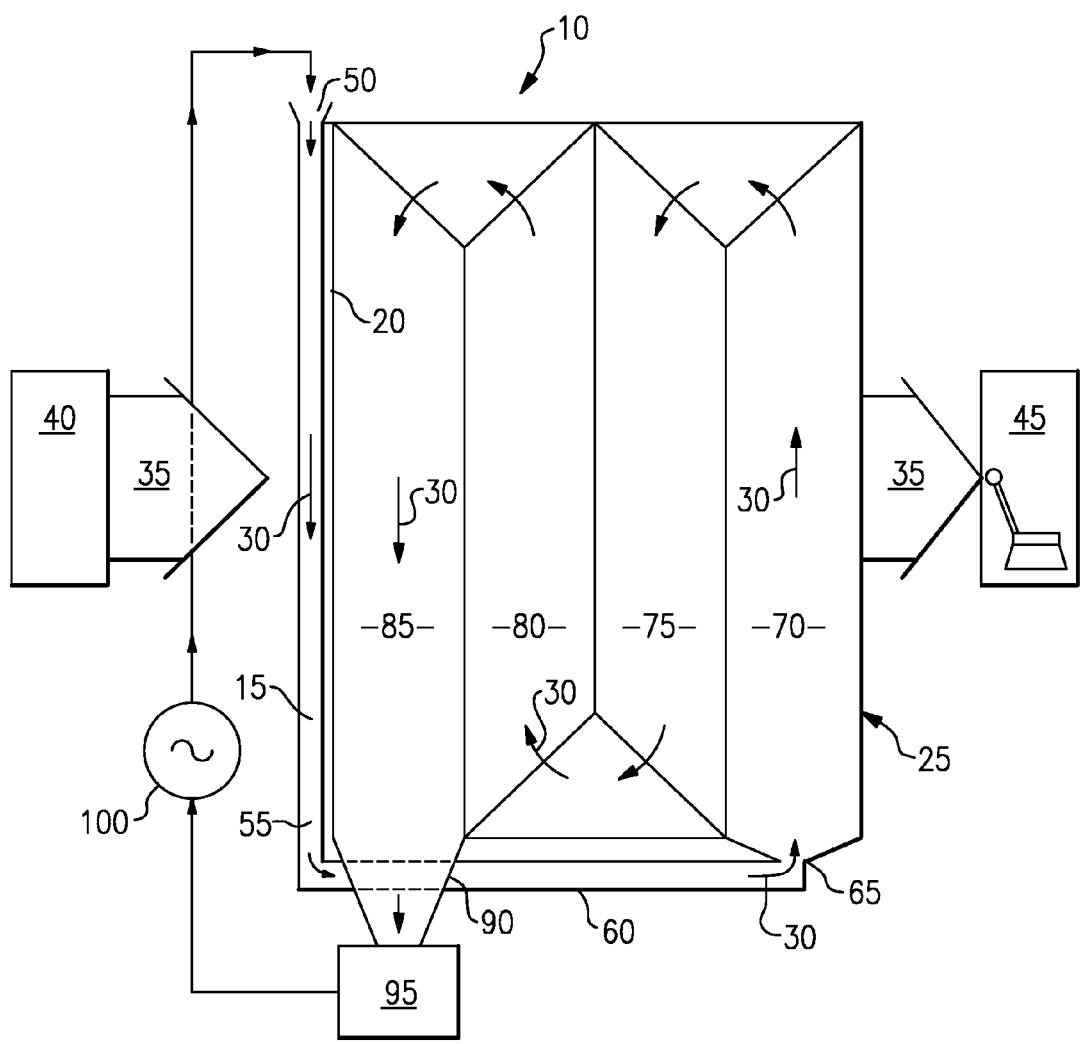
FIG. 1 is a perspective view of a heat exchanger of the invention.
Figure 2:
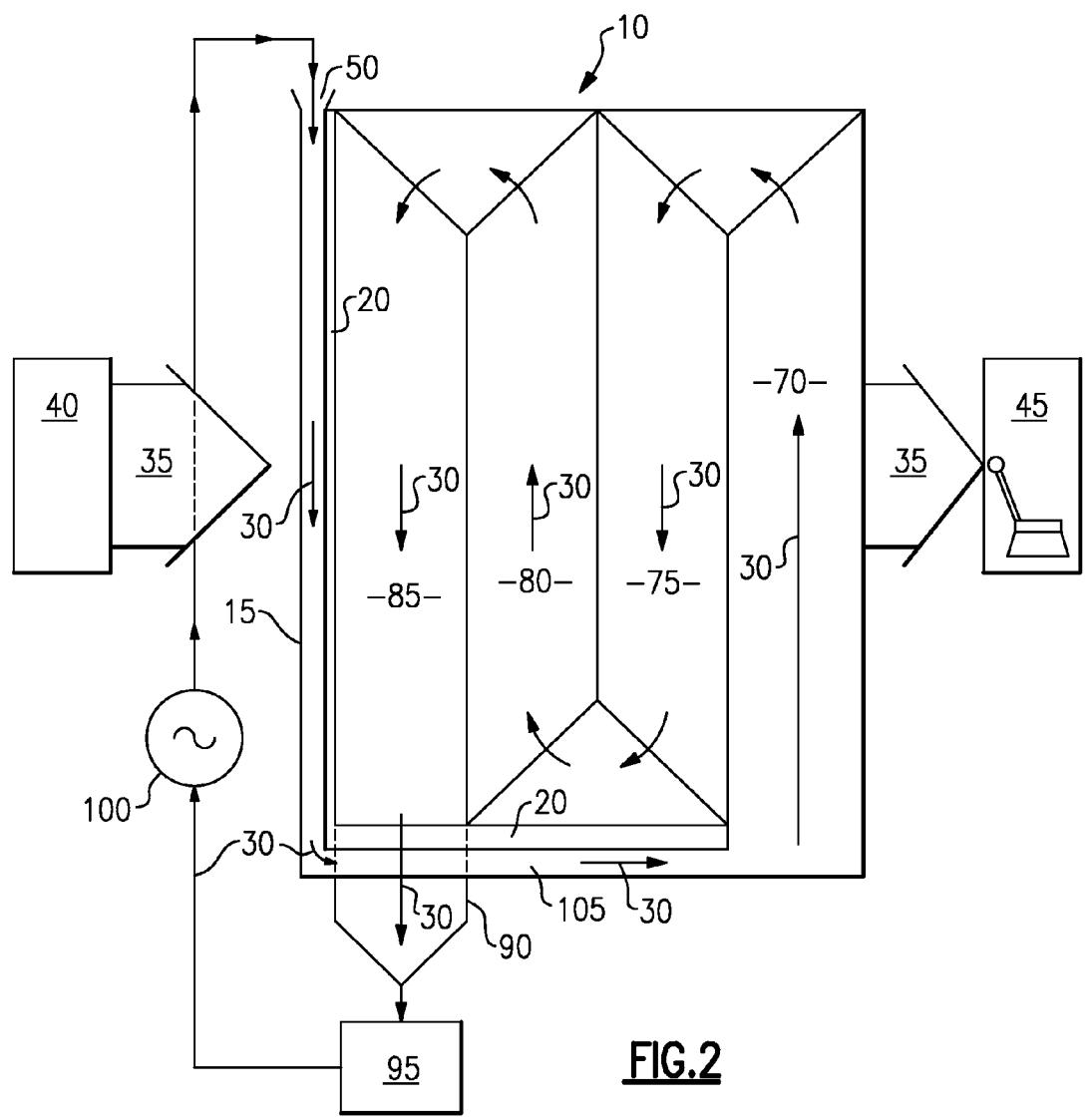
FIG. 2 is an alternative embodiment of the invention.

Referring now to FIGS. 1 and 2, the heat exchanger 10 of the invention is shown. The heat exchanger 10 has a section of melt fins 15, an air gap 20, and main fins 25. A medium (or fluid indicated by arrows 30), which acts in this embodiment as an anti-freeze like a mixture of propylene glycol and water, circulates through the fin sections 15, 25 of the heat exchanger 10 as will be discussed herein. Air 35 passing from an air cycle machine ("ACM") 40 passes through the heat exchanger 10 to be warmed by the medium 30 in the fin sections 15, 25 of the heat exchanger for use in an aircraft cabin 45. The air passes from the ACM 40 to the cabin 45 through layers (not shown) in the heat exchanger 10 that are to adjacent to the fin sections 15, 25 so that heat may be exchanged between the layers in the fins. The air gap 20 is disposed between the melt fins 15 and the main fins 25 within the heat exchanger 10.

As shown in FIG. 1, the medium 30 flows through the melt fins 15, after entering an inlet melt header 50, passes downwardly to a fin outlet header 55 through piping 60 outside the heat exchanger 10 to an inlet main header 65 to the main fins 25. As shown in both FIGS. 1 and 2, the medium flows in a tortuous path going upwardly through a first section 70 of main fins, turns through a second section 75 of main fins turns through a third section 80 of main fins, passes through a fourth section 85 of main fins and then outwardly through a medium outlet header 90. The air gap 20 is located between the melt fins 15 and the fourth section 85 of the main fins 25. One will understand that the terms upwardly and downwardly used herein are relative to the drawings shown and other directions and orientations are contemplated herein. Similarly, the number of turns and passes the medium takes while flowing through the heat exchanger 10 depends on the heat load to be removed and thus more or less passes are also contemplated herein.

After passing through the medium outlet header 90, the medium 30 cools heating loads of an aircraft including motor controllers for hydraulic pumps and compressors (shown schematically as 95). The medium 30 after cooling those objects (not shown) is delivered back to the inlet melt header 50. The medium 30 is moved through the heat exchanger and the heating loads by a pump or series of pumps that may be placed as required, shown schematically as 100.

Referring to FIG. 2, the medium 30 does not exit the heat exchanger 10 via fin outlet header 55 and reenter the heat exchanger via inlet main header 65 as shown in FIG. 1. The conduit 105 shown in FIG. 2 carries the medium 30 to the first section 70 of the main fins 25 without leaving the heat exchanger 10. Note also that the air gap 20 fully extends along the bottom of the second 75, third 80 and fourth 85 main pass main fins to further minimize heat transfer between the main fins 25 and the medium 30 in the conduit.

As stated above, the main fins 25 and the melt fins 15 are separated by the air gap 20. The air gap 20 which may be unsealed (see 105 as shown in FIG. 1) or sealed as shown in FIG. 2. If the air gap is unsealed, i.e. open to ambient, a user may detect leakage outside the heat exchanger by noticing medium outside of the heat exchanger. By sealing the insulation gap as shown in FIG. 2, the air barrier acts to minimize heat flow between the melt fins and the main fins.

As medium 30 returns from the heating loads 95, it is at its warmest temperature, in this case 70° F. as it enters the melt fins 15. The air 35 from the ACM 40 as it strikes the melt fins 15 is at its lowest temperature in this case −20° F. Because of the warmth of the melt fins 15, the probability that ice and snow will clog the fin sections 15, 25 of the heat exchanger 10 are minimized. The medium drops from 70° F. to about 55° F. after leaving the melt fins 15 and is conducted to the first section 70 of the main fins 25 by either the piping 60 as shown in the embodiment if FIG. 1 or the conduit 105 as shown in FIG. 2 for further cooling. In both embodiments, the air gap 20 keeps the relatively warm medium in and exiting from the melt fins 15 from warming the medium in the successively cooler medium in the fourth section 85 of the main fins 15 as shown in FIG. 1 and the second section 75, third section 80, and the fourth section 85 as shown in FIG. 2.

The medium passes through the main fins 25 in the tortuous path counter to the flow of air 35 through the heat exchanger to lower the temperature of the medium Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. For instance, the air gap 20 may be placed in the heat exchanger in position where it is important to separate relatively warm sections of a medium from cooled sections of the medium. Also, the fluid and medium described herein can substitute for one another and other flow paths may be used. The scope of legal protection given to this disclosure can only be determined by studying the following claims.

What is claimed is:

1. A heat exchanger system comprising:
a heat exchanger body including a first upstream end for receiving a relatively hot medium through a first flow path;
said first flow path communicating with downstream flow paths within said heat exchanger;
a device for moving a relatively cold air across said first flow path and into a use, with said relatively cold air being heated at said first flow path;
a gap provided between said first flow path and said downstream flow paths such that any heat exchange between said first flow path and said downstream flow paths is minimized;
said downstream flow paths communicate with locations to be cooled by said medium, with said medium increasing in temperature at said locations, and then being returned to said first flow path; and
said locations include motor controllers which are cooled by said medium, to increase the temperature of said medium before it is returned to the first flow path.

2. The heat exchanger as set forth in claim 1, wherein said use is a cabin for an aircraft cabin.

3. The heat exchanger system as set forth in claim 1, wherein said device for moving air is an air cycle machine to be associated with an aircraft.

* * * * *